United States Patent
Chang et al.

(10) Patent No.: US 7,493,408 B2
(45) Date of Patent: Feb. 17, 2009

(54) USB HOST PROTOCOL

(75) Inventors: Yeow Khai Chang, Singapore (SG); Jerome Tjia, Singapore (SG); Weng Fei Moo, Singapore (SG)

(73) Assignee: NXP, B. V., Eindhoven (NL)

( * ) Notice: Subject to any disclaimer, the term of this patent is extended or adjusted under 35 U.S.C. 154(b) by 812 days.

(21) Appl. No.: 10/850,327

(22) Filed: May 19, 2004

(65) Prior Publication Data

US 2005/0262262 A1 Nov. 24, 2005

Related U.S. Application Data

(60) Provisional application No. 60/471,704, filed on May 19, 2003.

(51) Int. Cl.
*G06F 15/16* (2006.01)
*G01R 31/08* (2006.01)
*H04B 7/005* (2006.01)
*H04L 12/54* (2006.01)

(52) U.S. Cl. .................. 709/232; 370/231; 370/278; 370/412; 709/233

(58) Field of Classification Search .............. 709/233
See application file for complete search history.

(56) References Cited

U.S. PATENT DOCUMENTS

| 7,315,515 B2 * | 1/2008 | Pazos | 370/231 |
| 2004/0073697 A1 * | 4/2004 | Saito et al. | 709/233 |

\* cited by examiner

*Primary Examiner*—Nathan J Flynn
*Assistant Examiner*—Anish Sikri
(74) *Attorney, Agent, or Firm*—Peter Zawilski

(57) ABSTRACT

A method of transferring bulk and control data from a first device to a second device over a USB bus comprises storing transfer descriptors, each including a transfer descriptor header and payload data, in a buffer memory in the first device. The data is read in packets for transfer to the second device, with packets being read from the transfer descriptors cyclically. When the first and second transfer descriptor headers, in first and second transfer descriptors respectively, define a common endpoint, data packets are read from only the first transfer descriptor, until such time as it is detected that all data packets from the first transfer descriptor have been transmitted, and thereafter data packets are read from the second transfer descriptor.

6 Claims, 6 Drawing Sheets

| | 7 | 6 | 5 | 4 | 3 | 2 | 1 | 0 |
|---|---|---|---|---|---|---|---|---|
| Byte 0 | Actual bytes (7:0) | | | | | | | |
| Byte 1 | Completion Code (3:0) | | | | Active | Toggle | | |
| Byte 2 | MaxPacketBytes (7:0) | | | | | | | |
| Byte 3 | Endpoint Number (3:0) | | | | Last | Speed | MaxPacketBytes (9:8) | |
| Byte 4 | Total bytes (7:0) | | | | | | | |
| Byte 5 | Paired | Ping-Pong | Res | Res | Dir Token (1:0) | | Total bytes (9:8) | |
| Byte 6 | 0 | Function Address (6:0) | | | | | | |
| Byte 7 | 00 | | | | | | | |

| Name | Access | Description |
|---|---|---|
| Actual bytes | R/W | Contains the number of bytes transferred for this PTD |
| Completion Code | R/W | Indicates state of connection with endpoint |
| Active | R/W | Set by firmware to enable the execution of transactions by the host controller. When the transaction associated with this PTD is completed, the host controller sets this bit to 0, indicating that a transaction should not be executed when this element is next encountered in the schedule. |
| Toggle | R/W | Updated after each successful transmission/reception of a data packet |
| MaxPacketBytes | R | Indicates the maximum number of bytes that can be sent to or from the endpoint in a single data packet |
| Endpoint Number | R | USB address of the endpoint within the function |
| Speed | R | Indicates the speed of the endpoint |
| Total bytes | R | Specifies the total number of bytes to be transferred with this data structure |
| Dir Token | R | Indicates SETUP, OUT or IN |
| Function Address | R | The USB address of the function containing the endpoint that this PTD refers to |
| Paired | R | Indicates this PTD is associated with another PTD |
| Ping-Pong | R | Differentiates one paired PTD from its associated PTD |

FIG. 6

USB HOST PROTOCOL

RELATED PATENT DOCUMENTS

This patent document claims the benefit, under 35 U.S.C. 119(e), of U.S. Provisional Patent Application Ser. No. 60/471,704 filed on May 19, 2003.

This invention relates to a method for transferring data over a bus system, and to an integrated circuit operating in accordance with the method.

A Universal Serial Bus (USB) system is used to connect various electronic items. One of the items, designated the host, is able to control communications with other electronic items, designated devices.

In the case where there is a host and one device, data can be transmitted from the host to the device, or from the device to the host. For example, in the case where the host is a personal computer (PC) and the device is a camera, picture data can be transferred from the camera to the PC. Conversely, in the case where the host is a PC and the device is a printer, printer data can be transferred from the host to the device.

Transmissions are controlled from the host, and use a specified host protocol.

In order to increase the data transfer rate between a transmitter and a receiver, a technique known as ping-pong buffering is known. That is, within the receiver, a common endpoint address is assigned to multiple endpoints. This allows the data rate to be increased because, while the contents of a FIFO memory associated with the first endpoint are being transmitted, the FIFO memory associated with a second endpoint can be filled with data.

However, this requires intervention from the processor in the transmitter.

The present invention seeks to provide a method of transmitting data at a high rate, without requiring intervention from the processor.

According to an aspect of the invention, there is provided a method of transferring bulk and control data from a first device to a second device, comprising:

forming data to be transferred into a plurality of transfer descriptors, each transfer descriptor comprising a transfer descriptor header and payload data, wherein each transfer descriptor header defines an endpoint to which the payload data is to be transmitted, and wherein the payload data comprises at least one packet;

storing the formed transfer descriptors in a buffer memory in the first device; and reading data from the memory in packets for transfer to the second device, with packets being read from the transfer descriptors cyclically;

further comprising, when first and second transfer descriptor headers, in first and second transfer descriptors respectively, define a common endpoint:

reading data packets from only the first transfer descriptor, until such time as it is detected that all data packets from the first transfer descriptor have been transmitted, and thereafter reading data packets from the second transfer descriptor.

This allows the data to be transferred at a high rate, without requiring intervention from the processor.

According to a further aspect of the invention, there is provided a host controller, for example a USB host controller, for controlling data transmission in accordance with the method of the first aspect.

The invention will be described with reference to the accompanying drawings in which:

FIG. 6 illustrates a format in which data may be stored in the memory of FIG. 3.

Figure 1:
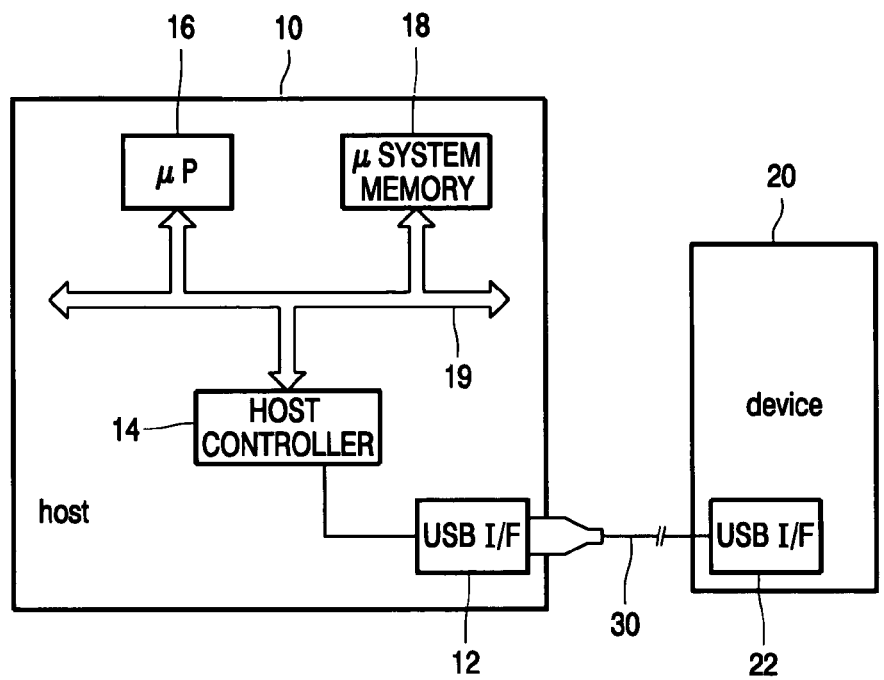
FIG. 1 is a block schematic diagram of a host and a device operating in accordance with the present invention.

FIG. 1 is a block schematic diagram of a system in accordance with the invention, in which a USB host 10, which may for example be a personal computer (PC), personal digital assistant (PDA), or any other suitable electronic equipment, is in communication with a USB device 20, which may for example be a digital camera, a printer, or any other suitable electronic equipment, by means of a Universal Serial Bus (USB) 30.

The terms 'host' and 'device' are used herein in accordance with the USB specifications, in which each system of interlinked components contain one host, which controls transmissions to and from the other components, the devices. It will however be appreciated that the invention is applicable to data transfer in other bus communications systems.

The host 10 and the device 20 have respective USB interface circuits 12, 22, the form of these interface circuits being generally conventional.

Transmissions over the bus 30 are controlled by means of an integrated circuit 14 located in the host, namely the host controller. In accordance with the USB specifications, the host controller 14 is able to communicate with more than one device simultaneously, although the invention is illustrated herein with reference to a system in which the host 10 is in communication with only one device 20.

Within the host 10, there is a microprocessor 16, and an associated system memory 18, and the host controller 14 is connected thereto by means of the microprocessor bus 19.

Figure 2:
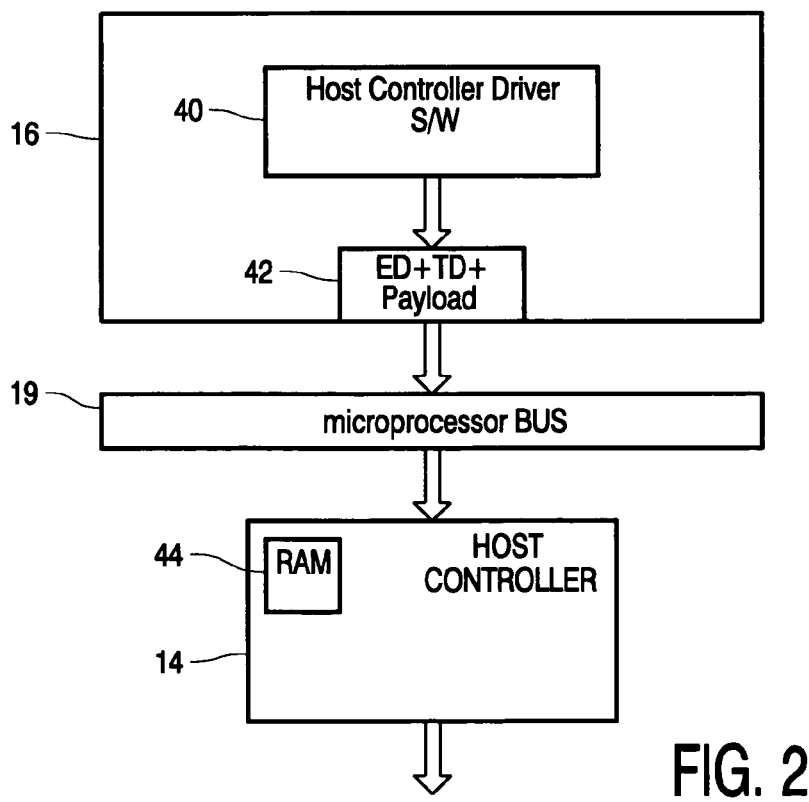
FIG. 2 is an enlarged schematic diagram of a part of the system of FIG. 1.

FIG. 2 is a schematic diagram showing a part of the host 10 in more detail, in order to illustrate the operation thereof.

The microprocessor 16 runs host controller driver software 40, of a form which is generally known. When data is to be transmitted to the device 20, the payload data is associated with an endpoint descriptor (ED) and a transfer descriptor header (TD), which are combined to form a single transfer descriptor (PTD) 42. This single transfer descriptor enables a transfer-based protocol over the bus 30. The PTD, plus the associated payload data, are then transferred over the microprocessor bus 19 into a random access memory (RAM) 44 within the host controller 14.

The transfer descriptor is then able to handle the transfer of data, including bulk and control data, but also transfer data and interrupt data. In particular, the transfer descriptor is able to take care of error conditions and handle retry in the event that a transmission is not acknowledged. Moreover, this is achieved without requiring intervention by the processor 16.

Figure 3:
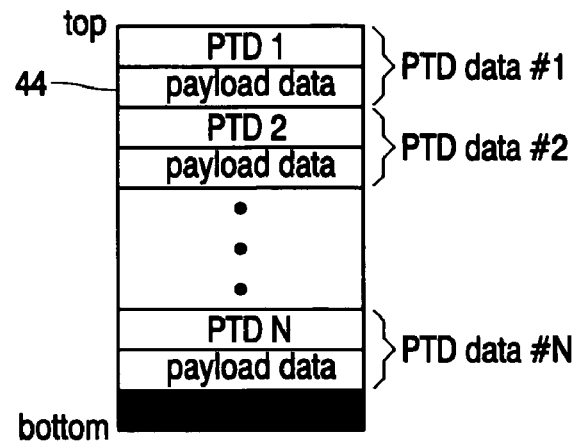
FIG. 3 is a schematic representation of the structure of a memory device within the system of FIG. 1.

FIG. 3 shows in slightly more detail the format in which data is stored within the RAM 44 of the host controller 14. Specifically, the RAM 44 contains a first transfer descriptor PTD1 and associated payload data, together forming PTD data#1, a second transfer descriptor PTD2 plus associated payload data, together forming PTD data#2, and so on, with a total of N such transfer descriptors and associated payload data. In this preferred embodiment of the invention, the RAM 44 can contain up to 4 kbytes of data.

In one preferred embodiment of the invention, the RAM 44 is divided into two buffers (not shown in FIG. 2), and data can be written into one buffer at the same time that data is being read from the other buffer.

For bulk and control data, each block of payload data is divided if necessary into multiple transactions. Each transaction has a packet size of 8, 16, 32 or 64 bytes.

Figure 4:
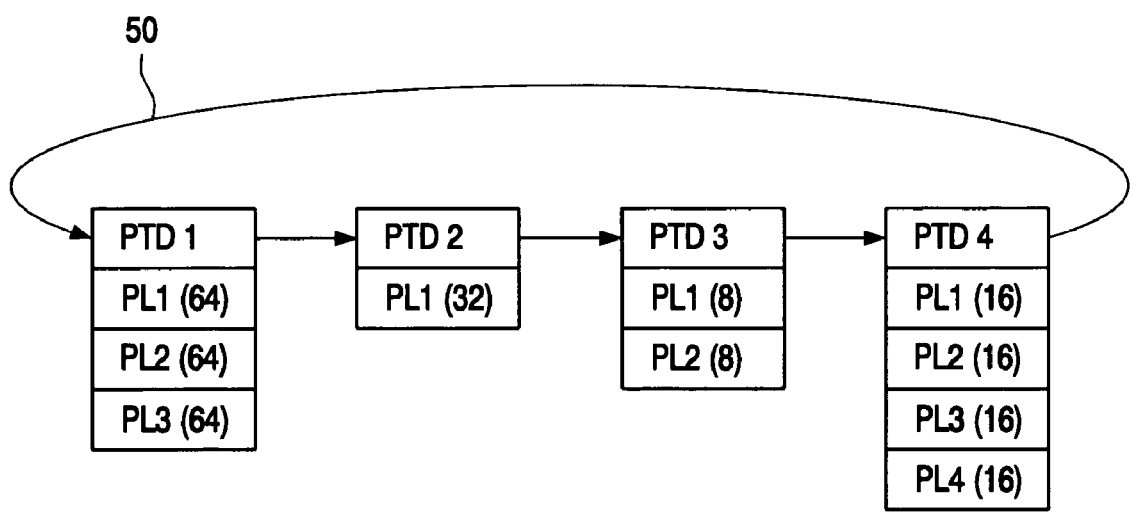
FIG. 4 is a schematic representation of data to be transmitted, stored in the memory of FIG. 3.

FIG. 4 shows a situation in which the payload bulk and control data associated with the first transfer descriptor PTD1 is divided into three packets, PL1, PL2 and PL3, each of 64 bytes; the payload data associated with the second transfer descriptor PTD2 comprises just one packet PL1 of 32 bytes; the payload data associated with the third transfer descriptor PTD3 is divided into two packets PL1 and PL2, each of 8 bytes; and the payload data associated with the fourth transfer descriptor PTD4 is divided into four packets PL1, PL2, PL3 and PL4, each of 16 bytes.

Figure 5:
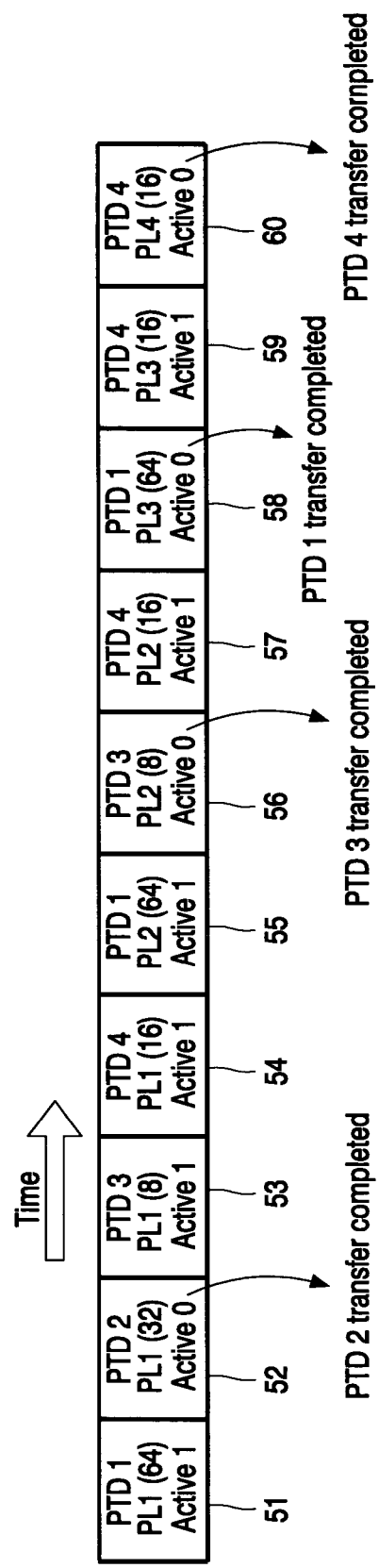
FIG. 5 illustrates a method by which the data of FIG. 4 may be transmitted.

FIG. 5 illustrates the method by which these packets of data are transferred out of the RAM 44, to their respective endpoints in respective devices connected to the host.

As shown by the arrow 50 in FIG. 4, a cyclical process occurs. Firstly, in step 51, the first packet PL1 associated with the first transfer descriptor PTD1 is transferred. The transfer descriptor contains an Active flag which is set high, to indicate that there remains more data associated with this transfer descriptor.

Secondly, in step 52, the first packet PL1 associated with the second transfer descriptor PTD2 is transferred. This transfer descriptor now contains an Active flag which is set low, indicating that this completes the transfer of the payload data associated with the second transfer descriptor PTD2.

Next, in steps 53 and 54, the first packets PL1 of payload data associated with the third and fourth transfer descriptors PTD3 and PTD4 respectively, are transferred. Again, each of these transfer descriptors contain an Active flag which is set high, indicating that there is more of the payload data associated with each of the transfer descriptors, remaining to be transferred.

Next, in step 55, the second packet PL2 of payload data associated with the first transfer descriptor PTD1 is transferred. The Active flag remains high, because there is still more of the payload data associated with that transfer descriptor, remaining to be transferred.

The transfer of the payload data associated with the second transfer descriptor PTD2 has been completed, and so, in step 56, the second packet PL2 of payload data associated with the third transfer descriptor PTD3 is transferred. This time, the Active flag in this transfer descriptor is set low, indicating that this completes the transfer of the payload data associated with the third transfer descriptor PTD3.

In step 57, the second packet PL2 of payload data associated with the fourth transfer descriptor PTD4 is transferred, and the Active flag remains high.

In step 58, the third packet PL3 of payload data associated with the first transfer descriptor PTD1 is transferred, and the Active flag is set low, indicating that this completes the transfer of payload data associated with the first transfer descriptor.

In steps 59 and 60, the third and fourth packets PL3 and PL4 of payload data associated with the fourth transfer descriptor PTD4 are transmitted, with the Active flag being set low in step 60, to indicate that this completes the transfer of the payload data associated with the fourth transfer descriptor PTD4.

FIG. 6 shows the format of a PTD header, which includes as bit 7 in byte 5 a bit which is designated 'Paired', and as bit 6 in byte 5 a bit which is designated 'Ping-Pong'.

Using this protocol, it is possible to set two transfer descriptors to transfer data to the same endpoint. In this case, the 'Paired' flag in the header is set high in both of the transfer descriptors. Of those two transfer descriptors, one is then set with the 'Ping-Pong' flag high (sometimes referred to as 'Pong'), while the other is set with the 'Ping-Pong' flag low (sometimes referred to as 'Ping').

In the preferred embodiment of the invention, in which the RAM 44 contains two ATL buffers, each of the ATL buffers can contain only one PTD in which the 'Paired' flag in the header is set high. Of course, if one of the ATL buffers contains a PTD in which the 'Paired' flag in the header is set high, then the other ATL buffer contains the associated PTD in which the 'Paired' flag in the header is also set high.

Although the invention is described herein with reference to an embodiment in which the 'Ping-Pong' flag is a single bit, allowing differentiation between just two 'Paired' PTDs, other embodiments are also possible, in which more than two (for example, four) PTDs may be associated together, in which case a multi-bit (for example two-bit in the case where there are four associated PTDs) flag is required to differentiate between the associated PTDs.

A register within the host controller 14 then contains a bit value which is of the same length as the 'Ping-Pong' flag. That is, in the illustrated embodiment, it contains a single bit value. For example, the register may be set so that its bit value is initially low. Then, when the host controller is determining which data to transfer, data is transferred from one of the paired transfer descriptors only if its 'Ping-Pong' flag matches the value stored in this register.

Figure 7:
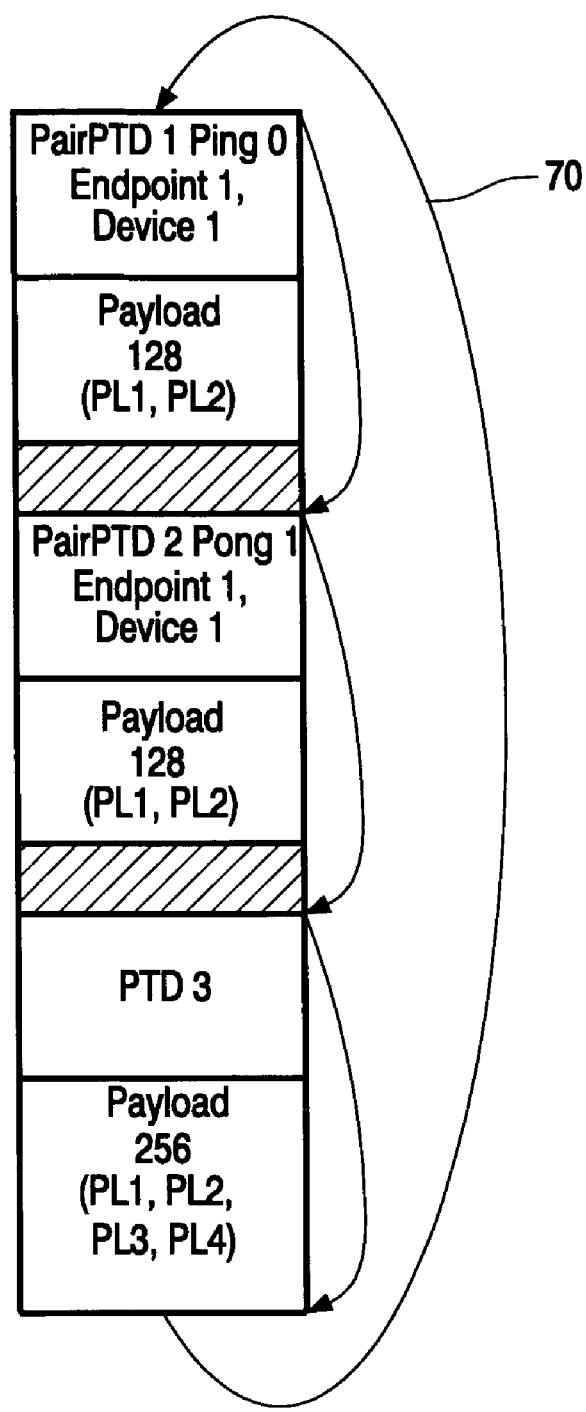
FIG. 7 is a schematic representation of data stored in the memory of FIG. 3.

FIG. 7 illustrates a situation in which the RAM 44 contains three transfer descriptors, PTD1, PTD2 and PTD3, the first two of which are paired, indicating that they are transmitting data to the same endpoint, while the third is transmitting data to a different endpoint. In this simplified example, the first and second transfer descriptors each contain 128 bytes of data, and thus are each divided into two packets PL1, PL2, each of the maximum allowable size, namely 64 bytes. The third transfer descriptor PTD3 has a payload of 256 bytes, and is therefore divided into four packets PL1, PL2, PL3 and PL4, each of 64 bytes.

In the case of bulk and control data, the order in which the data is transferred is important, and so the present invention provides a mechanism by which all of the payload data associated with the first transfer descriptor is transferred before any of the payload data associated with the second transfer descriptor is transferred.

As illustrated by the arrow 70, and as described with reference to FIGS. 4 and 5, the transfer of data is cyclical, in that data associated with the first transfer descriptor PTD1 is transferred, then data from the other transfer descriptors is transferred, on a packet-by-packet basis.

Figure 8:
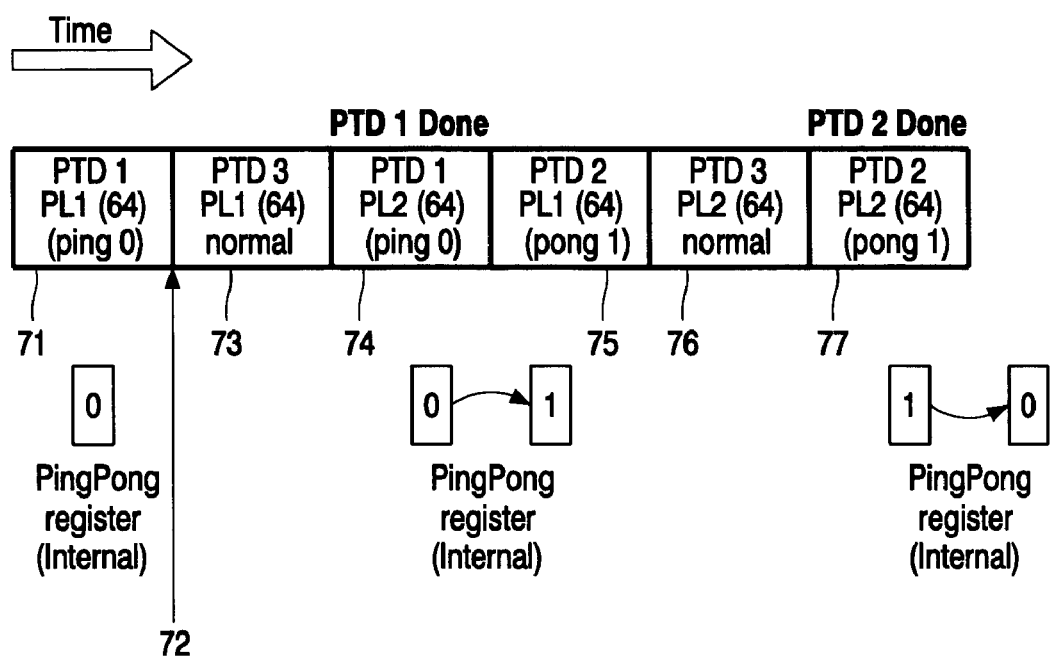
FIG. 8 illustrates a method by which the data of FIG. 7 may be transmitted.

Thus, as shown in FIG. 8, in step 71, the first packet PL1 of payload data associated with the first transfer descriptor PTD1 is sent. This packet can be sent because the value of the 'Ping-Pong' flag, which is set low ('Ping') for PTD1, matches the initial value stored in the internal 'Ping-Pong' register of the host controller 14.

Based on the cyclical process described above, it would be expected that payload data associated with the second transfer descriptor PTD2 would be transmitted next. However, the value of the 'Ping-Pong' flag associated with the second transfer descriptor PTD2, which has been set high ('Pong') in this case, does not match the value currently stored in the internal 'Ping-Pong' register of the host controller 14, and so, at point 72, it is determined that no data associated with the second transfer descriptor PTD2 should be transmitted. Thus, in step 73, a first packet PL1 of data from the unpaired (or normal) third transfer descriptor PTD3 is transmitted. Then, in step 74, a second packet PL2 of data associated with the first transfer descriptor PTD1 is transmitted. When this data has been transmitted, it is determined that all of the data associated with the first transfer descriptor PTD1 has been transferred, and the value of the internal 'Ping-Pong' register of the host controller 14 is set to 1.

Then, when, in step 75, the process examines the second transfer descriptor PTD2, it is determined that the value of its 'Ping-Pong' flag matches the new value stored in the internal 'Ping-Pong' register of the host controller 14. Thus, a first packet PL1 of data associated with the second transfer descriptor PTD2, can be transferred. Next, in step 76, a second packet PL2 of data associated with the third transfer descriptor PTD3 is transferred.

Then, in step 77, a second packet PL2 of data associated with the second transfer descriptor PTD2, is transferred. At that point, it can be determined that all of the data associated with the second transfer descriptor PTD2 has been transferred, and the value stored in the internal 'Ping-Pong' register of the host controller 14 is toggled back to its original low value.

Thereafter, the third and fourth packets of data associated with the third transfer descriptor PTD3 can be transferred (not shown in FIG. 8).

This therefore ensures that the intended order can be maintained, within the data which is being sent to the endpoint which is shared by PTD 1 and PTD 2, in that data is transferred from the second transfer descriptor only once all of the data associated with the first transfer descriptor has been transmitted.

Moreover, by storing data associated with the two transfer descriptors in different ATL buffers of the RAM 44, data can be written into the second transfer descriptor while it is already being read from the first transfer descriptor.

Moreover, the determination regarding the transfer of data from the two paired transfer descriptors can be made internally by the host controller 14, without requiring any intervention by the microprocessor 16.

The invention claimed is:

1. A method of transferring bulk and control data from a first device to a second device, comprising:
    forming data to be transferred into a plurality of transfer descriptors, each transfer descriptor comprising a transfer descriptor header and payload data, wherein each transfer descriptor header defines an endpoint to which the payload data is to be transmitted, and wherein the payload data comprises at least one packet;
    storing the formed transfer descriptors in a buffer memory in the first device; and reading data from the memory in packets for transfer to the second device, with packets being read from the transfer descriptors cyclically;
    further comprising, when first and second transfer descriptor headers, in first and second transfer descriptors respectively, define a common endpoint:
    setting respective flags in the first and second transfer descriptor headers to different values;
    setting a register value to an initial value, which is equal to the value of the flag in the first transfer descriptor header;
    determining when all data packets from the first transfer descriptor have been transmitted, and thereafter changing the register value to be equal to the value of the flag in the second transfer descriptor header; and
    reading data packets from the first and second transfer descriptor only when the value of the respective flag therein is equal to the register value.

2. A method as claimed in claim 1, wherein the buffer memory comprises first and second buffers, the method further comprising, when the first and second transfer descriptor headers define a common endpoint:
    storing the first and second transfer descriptors in different ones of the first and second buffers.

3. A method as claimed in claim 1, wherein the first device comprises a USB host controller.

4. A host controller, for use in a bus communication system, the host controller comprising:
    a buffer memory, for storing data to be transferred in a plurality of transfer descriptors, each transfer descriptor comprising a transfer descriptor header and payload data, wherein each transfer descriptor header defines an endpoint to which the payload data is to be transmitted, and wherein the payload data comprises at least one packet; and
    means for reading data from the buffer memory in packets for transfer to a second device, with packets being read from the transfer descriptors cyclically;
    the host controller being adapted, when first and second transfer descriptor headers, in first and second transfer descriptors respectively, define a common endpoint:
    to set respective flags in the first and second transfer descriptor headers to different values;
    to set a register value to an initial value, which is equal to the value of the flag in the first transfer descriptor header;
    to determine when all data packets from the first transfer descriptor have been transmitted, and thereafter to change the register value to be equal to the value of the flag in the second transfer descriptor header; and
    to read data packets from the first and second transfer descriptor only when the value of the respective flag therein is equal to the register value.

5. A host controller as claimed in claim 4, wherein the buffer memory comprises first and second buffers, the host controller being adapted, when the first and second transfer descriptor headers define a common endpoint:
    to store the first and second transfer descriptors in different ones of the first and second buffers.

6. A host controller as claimed in claim 4, comprising a USB host controller.

* * * * *